United States Patent
Chamba (12)

(10) Patent No.: US 6,748,986 B2
(45) Date of Patent: Jun. 15, 2004

(54) GRANULAR MATERIAL DISPENSER

(76) Inventor: Jean-Pierre Chamba, 50 bis, rue Laure Diebold, 69009, Lyons (FR)

(*) Notice: Subject to any disclaimer, the term of this patent is extended or adjusted under 35 U.S.C. 154(b) by 0 days.

(21) Appl. No.: 10/312,751

(22) PCT Filed: Jun. 25, 2001

(86) PCT No.: PCT/FR01/02009

§ 371 (c)(1),
(2), (4) Date: Mar. 25, 2003

(87) PCT Pub. No.: WO02/00526

PCT Pub. Date: Jan. 3, 2002

(65) Prior Publication Data

US 2003/0159751 A1 Aug. 28, 2003

(30) Foreign Application Priority Data

Jun. 28, 2000 (FR) .............................................. 00/08333

(51) Int. Cl.[7] .............................. B65B 1/04; B65B 3/00; B67C 3/00

(52) U.S. Cl. ..................... 141/358; 141/18; 141/266; 141/283; 141/373; 141/383; 222/354

(58) Field of Search ....................... 141/18, 250, 252, 141/266, 281, 282, 283, 351, 358, 363–366, 368, 373, 383; 222/354, 355, 361, 366

(56) References Cited

U.S. PATENT DOCUMENTS

| | | | | |
|---|---|---|---|---|
| 4,175,679 A | * | 11/1979 | Ponce et al. | 222/650 |
| 4,706,849 A | * | 11/1987 | Ryan | 222/80 |
| 4,733,803 A | * | 3/1988 | Sisson et al. | 222/276 |
| 6,357,490 B1 | * | 3/2002 | Johnston et al. | 141/2 |
| 2002/0145010 A1 | * | 10/2002 | Ufheil et al. | 222/153.14 |

* cited by examiner

Primary Examiner—Timothy L. Maust
(74) Attorney, Agent, or Firm—Cantor Colburn LLP

(57) ABSTRACT

A dispenser for granular material in predetermined doses is provided, including an upper part forming a reservoir for storing the granular material, and a lower part forming a base supporting a metering device, the upper and lower parts of the dispenser being separated by a horizontal wall comprising a flow window, the metering device including a closure member that can move between an adjustable open position in which the granular material can flow through the flow window into a removable receptacle and a closed position in which the closure member closes off the flow window, the movement of the closure member between the passing position and the closed position is achieved by pulling on the receptacle, the receptacle being rendered temporarily secured to the closure member during movement between the two positions, and the movement of the closure member between the closed position and the passing position being achieved by pushing on the receptacle, the receptacle including means for forming a stop coming to bear against the closure member.

18 Claims, 8 Drawing Sheets

GRANULAR MATERIAL DISPENSER

FIELD OF INVENTION

The present invention relates to a dispenser of granular material in predetermined doses.

DESCRIPTION OF RELATED ART

Material in the form of granules, such as dry pet food or washing powder, is usually metered and dispensed using a graduated cup with which a user scoops out granular material from an already-opened bag.

Metering is performed somewhat approximately because the cup can pick up an amount of granular material which is greater than or less than the required dose. The content of the cup then has to be adjusted either by tipping out some granular material or topping it up.

Furthermore, when it is a question of dispensing dry pet food, the user's fingers come into contact with the pet food. This is greasy and often forces the user to wash his or her hands after this operation.

In addition, the action of the cup in the food causes the food to be churned around and become oxygenated and oxidized in the air.

This type of dispensing is therefore somewhat impractical, gives poor repeatability of doses of product for dispensing and is rather unhygienic.

SUMMARY OF THE INVENTION

The present invention therefore sets out to overcome these drawbacks by supplying a dispenser for granular material which is easy to handle.

Furthermore, the invention supplies a dispenser that allows predetermined doses to be dispensed with excellent repeatability.

Finally, the invention provides a dispenser which allows the product for dispensing to be stored under hygienic conditions.

According to the invention, the dispenser for granular material comprises:
- an upper part forming a reservoir intended to store the granular material,
- a lower part forming a base supporting a metering device, the upper and lower parts of the dispenser being separated by a horizontal wall comprising a flow window.

The metering device comprises:
- a closure member that can move between an adjustable open position in which the granular material can flow through the flow window into a removable receptacle and a closed position in which the closure member closes off the flow window,
- the movement of the closure member between the passing position and the closed position being achieved by pulling effected on the receptacle, said receptacle being rendered temporarily secured to the closure member during the movement between these two positions,
- the movement of the closure member between the closed position and the passing position being achieved by a push effected on the receptacle, the receptacle being equipped with means forming a stop coming to bear against the closure member.

This dispenser is therefore particularly simple to use because its use requires just two handling operations to be performed. On the one hand, the user pulls on the receptacle to remove it from the dispenser, the receptacle being filled with a prescribed dose of granular material. On the other hand, having emptied the receptacle of its dose of granular material, the user pushes on the receptacle to put it back in position in the dispenser. This dispenser is therefore particularly easy to operate.

According to a first embodiment of the dispenser, the receptacle is equipped with at least one rack able to collaborate with at least one tab secured to the closure member supporting a tooth, the tab being able to move between a position in which it engages in each rack, thus securing the closure member and the receptacle, and a second position in which the tab becomes effaced against a ramp disconnecting the receptacle from the closure member.

Securing the receptacle and the closure member makes it possible, by pulling on the receptacle, to move the closure member from the open position in which the granular material flows into the receptacle through the flow window into the position in which the flow window is closed off by the closure member. Disconnection allows the receptacle to be released so that the dose with which it is filled can be emptied out.

Advantageously, the racks are situated on the longitudinal edges of the receptacle.

Advantageously, the receptacle is equipped with ribs sliding in slots formed on the horizontal wall.

According to a second embodiment of the dispenser, the receptacle is equipped with at least one rack complementing at least two toothed segments which are arranged on each of the flanks of the closure member parallel to the axis of movement thereof, the toothed segments being able to move between a position in which they protrude beyond the flanks of the closure member and mesh in the racks of the receptacle thus securing the closure member and the receptacle, and a second position in which the toothed segments retract into the closure member thus disconnecting the receptacle from the closure member.

Advantageously, two rigid rods are arranged inside the closure member more or less along its diagonals, each being able to move in rotation with respect to the point of intersection of the diagonals and kept apart by elastic means, each being equipped at one of its ends with a toothed segment and at the other of its ends, protruding beyond the closure member, with an unlocking stud capable of becoming effaced inside the closure member against a bearing surface so as, through a scissors effect, to cause the toothed segments to retract.

The rigid rods allow the closure member and the receptacle to be secured together reversibly through a scissors effect.

In one advantageous embodiment of the invention, the rods are held apart by at least one leaf spring.

According to various features that the dispenser according to the invention might have:
- the receptacle slides in a corridor formed in the lower part of the dispenser, the vertical walls of this corridor acting as a bearing surface for the ramps protruding beyond the closure member,
- the closure member is equipped with lateral lugs that complement grooves formed in the lower part of the dispenser,
- the closure member is equipped with a bearing arm extending at right angles to one of its flanks and able to come to bear against an adjustable surface.

In one embodiment of the adjustment of the position of the closure member, a flexible strip sliding in translation parallel to the direction of travel of the closure member has a stop against which the arm comes to bear.

The position of the closure member can thus be adjusted in an extremely simple way.

According to a first alternative form, the strip has a toothed edge in which a toothed wheel engages, rotation of the wheel causing translational movement of the strip.

According to a second alternative form of embodiment, the strip has a slider protruding from a slot formed in the wall of the reservoir and allowing it to be slid.

In a second embodiment of the adjustment of the position of the closure member, an endless screw, which can be turned by a knurled knob is arranged in the lower part of the dispenser, parallel to the axis of travel of the closure member, the endless screw taking a floating nut against which the bearing arm of the closure member butts.

Adjusting the position of the nut makes it possible to vary the position of the closure member with respect to the opening and therefore makes it possible to vary the dose of granular material that is to be withdrawn.

Advantageously, the end of the closure member facing the receptacle has an inclined plane and allows the granular material to be made to flow back toward the reservoir when the closure member is moved from the position of closure of the flow window to the position in which the flow window is open.

Advantageously, the receptacle is equipped with two bosses which come to bear against the closure member when a pushing action is exerted on the receptacle, so as to bring the closure member from the position of closure to the position in which the flow window is open at the end of the push, the bosses becoming housed in slots formed in the closure member.

The bosses with which the receptacle is equipped allow the closure member to be pushed back into the position in which the flow window is open.

Advantageously, a hopper having flanks which converge toward an opening, is arranged inside the reservoir.

The hopper, because of its converging shape, allows the granular material to all be discharged toward the flow window.

Advantageously, the side of the opening of the hopper or of the flow window is equipped with a rubber blade making it possible to prevent the granular material from becoming wedged between the closure member and the edge of the opening of the hopper.

For a good understanding thereof, the invention is described hereinafter depicting, by way of examples, several embodiments of the dispenser according to the invention.

DETAILED DESCRIPTION OF THE PREFERRED EMBODIMENT

Figure 1:
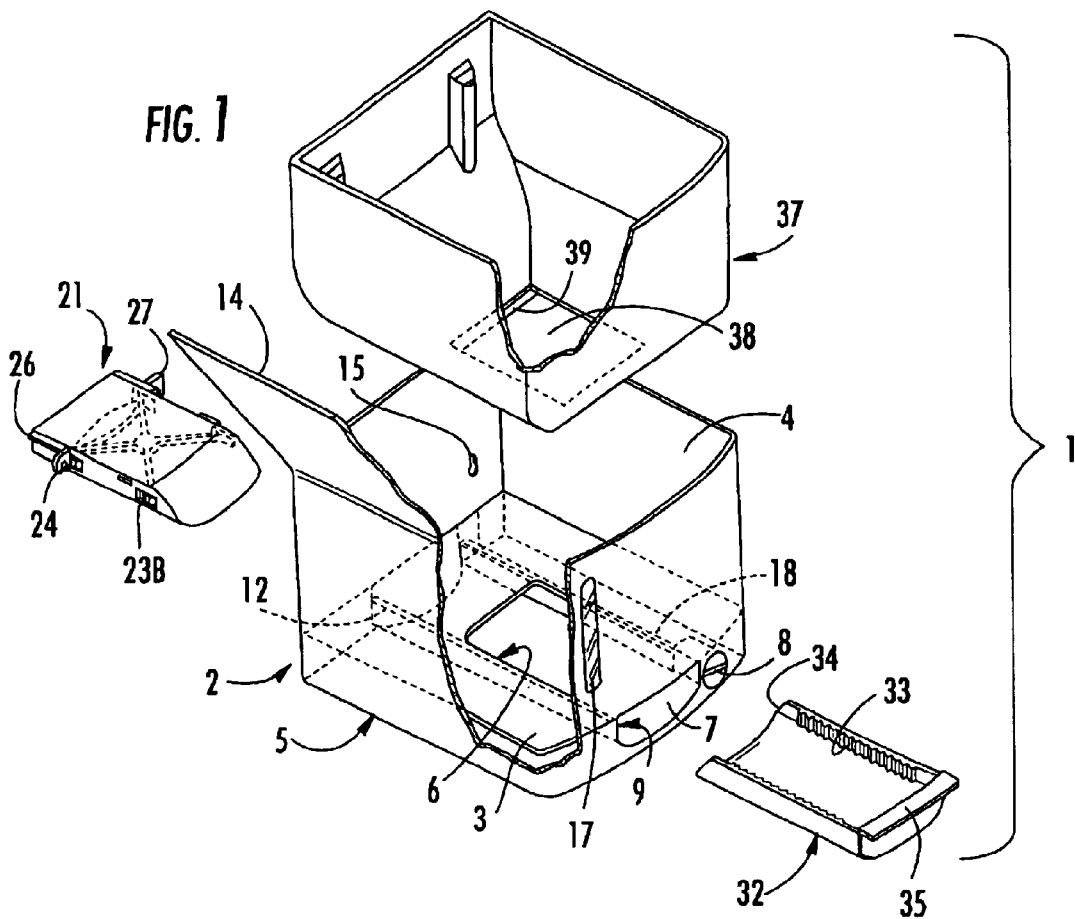
FIG. 1 is an exploded perspective view with partial cut-away of the dispenser according to the invention.
Figure 2:
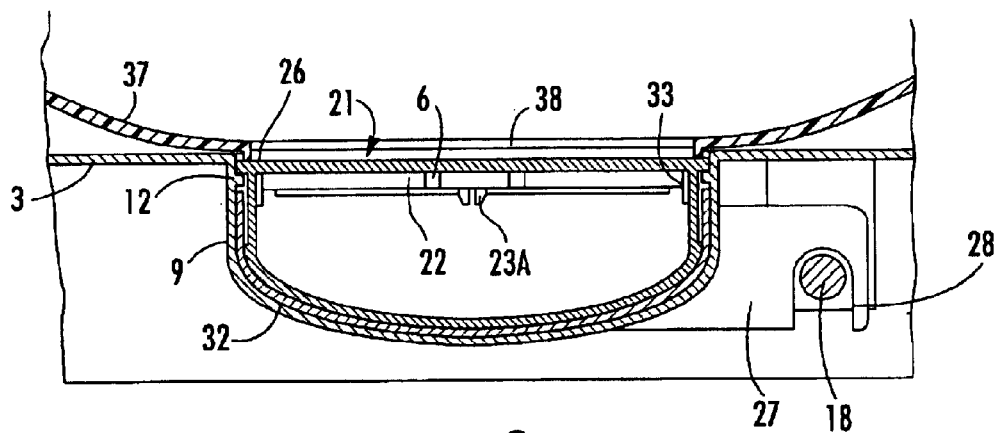
FIG. 2 is a view in section of the metering device.

As is apparent from FIG. 1, the dispenser, indicated in the drawings at reference numeral 1 and referred to generally herein as "the dispenser", consists of a housing 2 made of injection-molded plastic.

The housing 2 comprises a horizontal wall 3 which divides the housing into an upper reservoir 4 and a base 5 which houses a metering device.

The front facade of the housing has a knurled knob 8 and an opening 7 the upper side of which adjoins the wall 3.

A corridor 9 opens into the opening 7. The corridor 9 is extended by two slots 12 which open into the rear face of the housing 2.

The housing 2 is closed, on its upper face, by a hinged lid 14 and, on the rear face, has keyhole-slot openings 15 so that it can be wall-mounted.

To check the level of granular material present in the upper reservoir 4, the housing has a transparent vertical peep-hole 17.

The knurled knob 8 operates an endless screw 18 on which a floating nut 19 travels.

Figure 6:
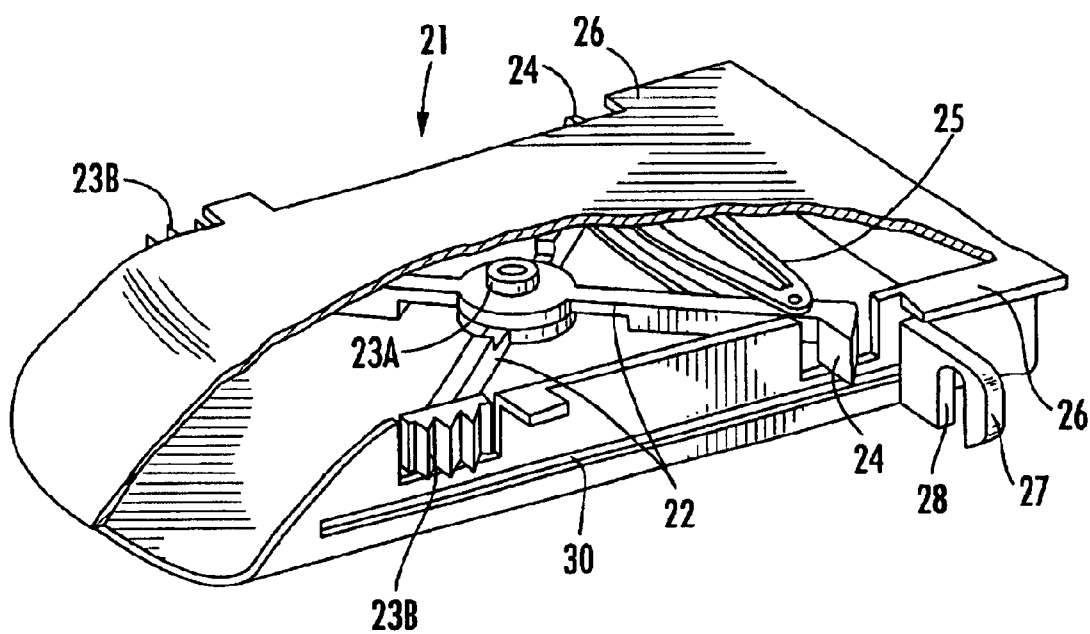
FIG. 6 is a perspective view with partial cut-away of the closure member.

The dispenser also comprises a closure member 21. The closure member, which is shown in perspective with cut-away in FIG. 6, is a roughly parallelepipedal element having a front part in the form of a ramp. The flanks of the closure member 21 are equipped with horizontal support lugs 26 situated in the upper plane thereof.

Inside the closure member 21, two rigid rods 22 are arranged more or less along the diagonals of the closure member. The rods 22 are fixed by a clip 23A, best seen in FIG. 6, which holds them able to move in rotation. The ends of these rods protrude beyond the closure member 21 via slotted apertures made in the flanks thereof.

The ends of the rods 22 protruding from the front side of the closure member 21 are equipped with toothed segments 23B, the ends of the rods 22 protruding from the rear side are equipped with unlocking studs 24.

The rods 22 are held apart by plastic leaf springs 25.

The closure member also has an arm 27 which extends at right angles to one of its flanks. The arm 27 has a notch 28.

The flanks of the closure member 21 each have a longitudinal slot 30 which does not open into the front face of the closure member.

The dispenser also comprises a receptacle 32. The receptacle 32 is in the form of a parallelepiped, open on its upper face and its front face, of a size that complements the dimensions of the corridor 9 of the housing 2. The bottom, the longitudinal flanks and the rear face of the receptacle are molded in plastic.

The flanks of the receptacle 32 each receive, on their interior face, a rack 33 and a boss 34 situated near the open end of the receptacle.

The receptacle is equipped with a handle 35 protruding beyond its rear face.

The dispenser finally comprises a hopper 37 having an opening 38, the walls of the hopper converging toward the opening 38. The hopper 37 is inserted in the upper reservoir 4 of the housing, the opening 38 superposed over the window 6.

The side of the opening 38 situated on the same side as the closure member 21 is equipped with a rubber blade 39.

The way in which the dispenser works will now be described.

Figure 3:
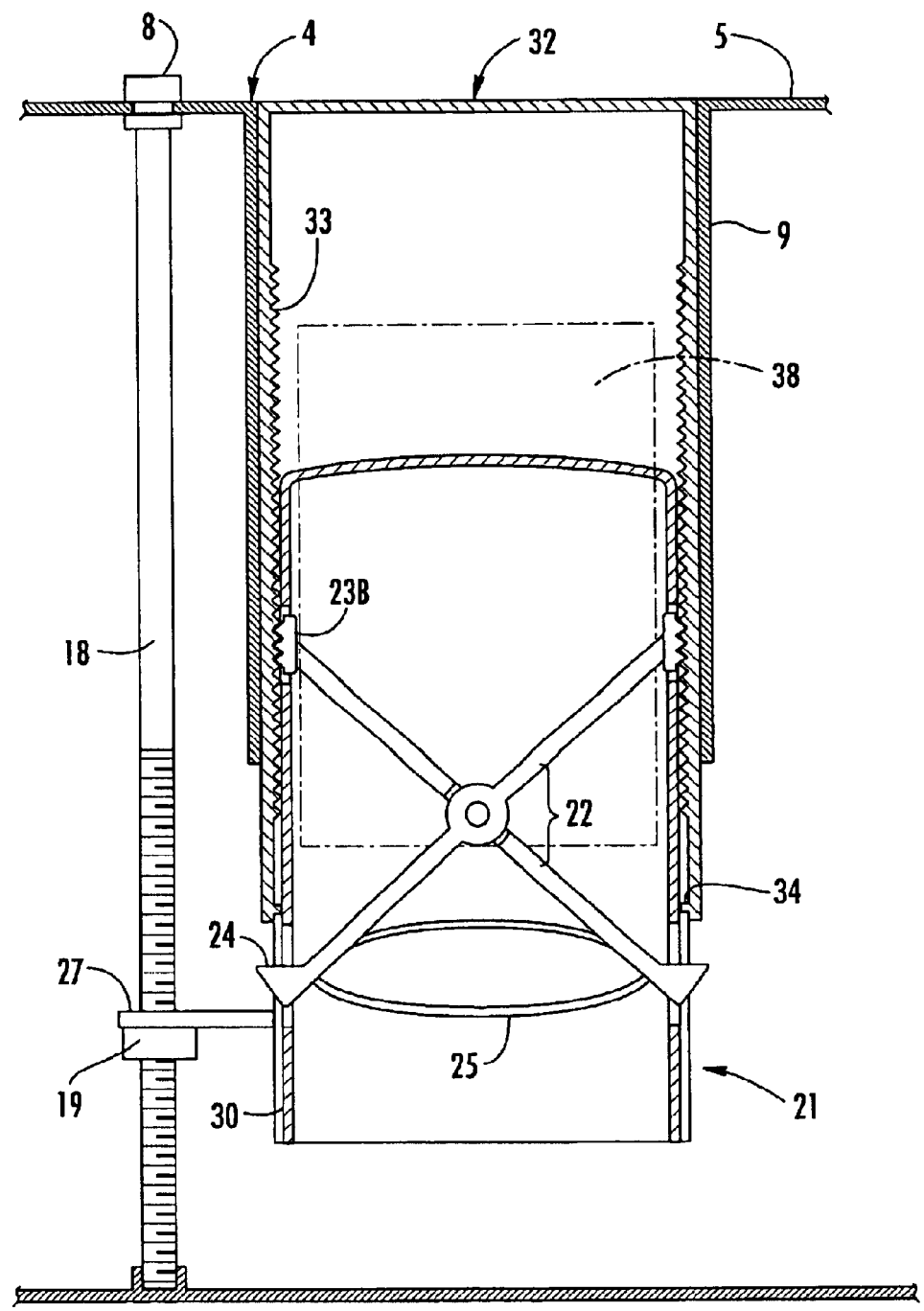
FIGS. 3, 4 and 5 depict views in section of the dispenser during operation.

FIG. 3 depicts the dispenser in a standby position.

In this position, the closure member 21 is in abutment against the nut 19 via the arm 27. The nut 19, preset by turning the endless screw 18, sets the position of the closure member 21 with respect to the opening 38.

The receptacle 32 is inserted into the corridor 9. Each of the segments 23B, protruding from the closure member, is enmeshed in each of the racks 33 of the receptacle 32, rendering the closure member 21 and the receptacle 32 secured together.

Under the effect of gravity, the granular material present in the hopper 37 flows into the receptacle 32 through the portion of the opening 38 which is not closed off by the closure member 21.

The operator, wishing to remove a dose of granular material, pulls on the receptacle 32.

The receptacle 32 slides inside the corridor 9 and, being secured to the closure member, causes the closure member 21 to move, the support lugs of which member slide in the slots 12.

The ramp-shaped front part of the closure member allows the granular material to be made to flow back toward the hopper 37, making it easier for the closure member/receptacle entity to be moved. The rubber blade 39 prevents any granular material from becoming wedged between the closure member and the edge of the opening 38.

Figure 4:
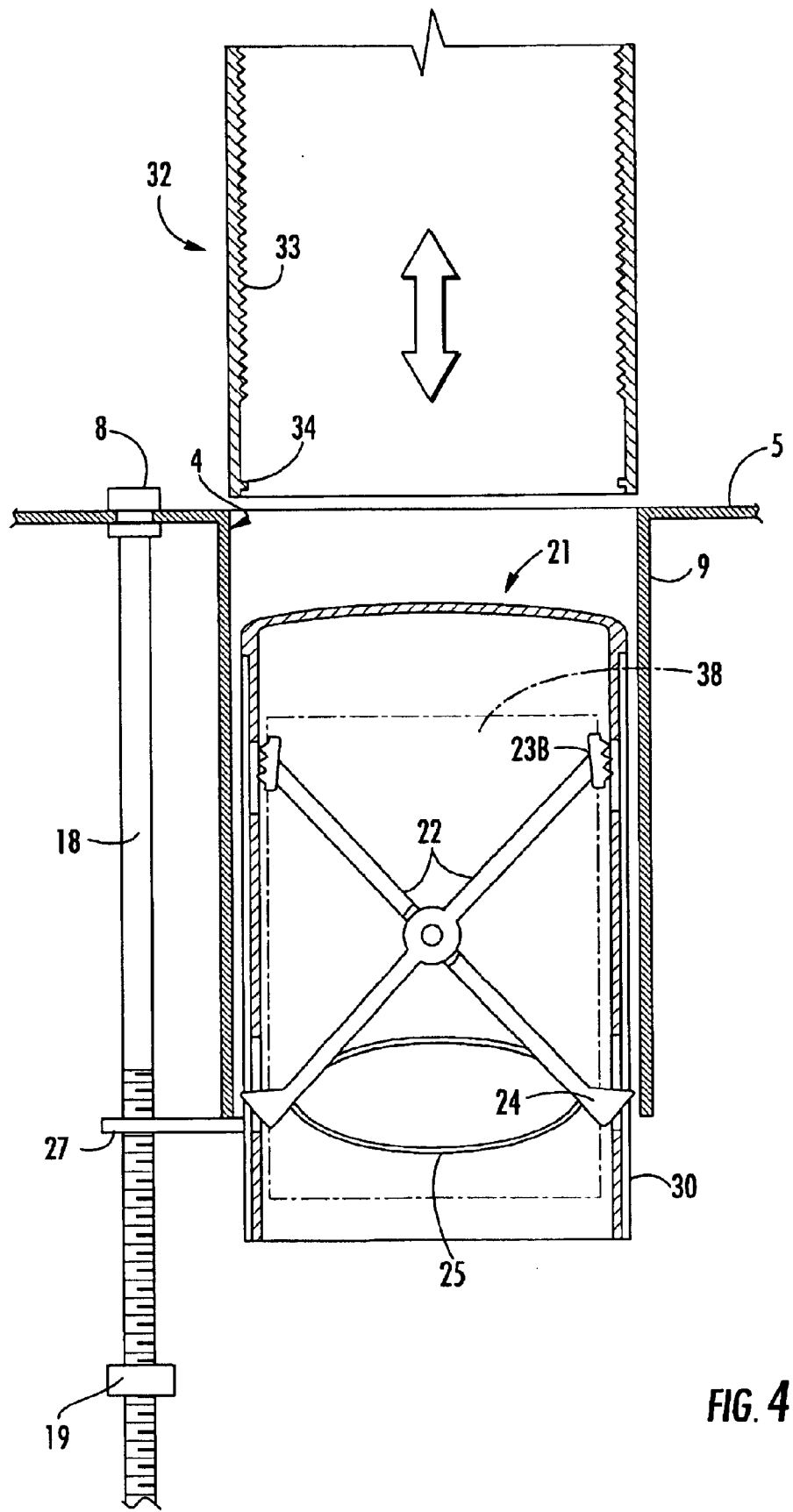

As visible in FIG. 4, the unlocking studs 24, which protrude beyond the flanks of the closure member, come into contact with the wall of the corridor 9 and become effaced against the walls thereof, the closure member 21 then completely closing off the window 38.

Through a scissors effect, the toothed segments 23B then retract into a position in which they are no longer in engagement with the racks 33 of the receptacle.

The arm 27 of the closure member comes into abutment against the corridor 9.

The receptacle 32 is disconnected from the closure member and is therefore free for the dose of granular material thus removed to be emptied out.

Once this operation has been performed, the receptacle 32 is offered up facing the opening 7 of the housing 2 and inserted into the corridor 9.

Figure 5:
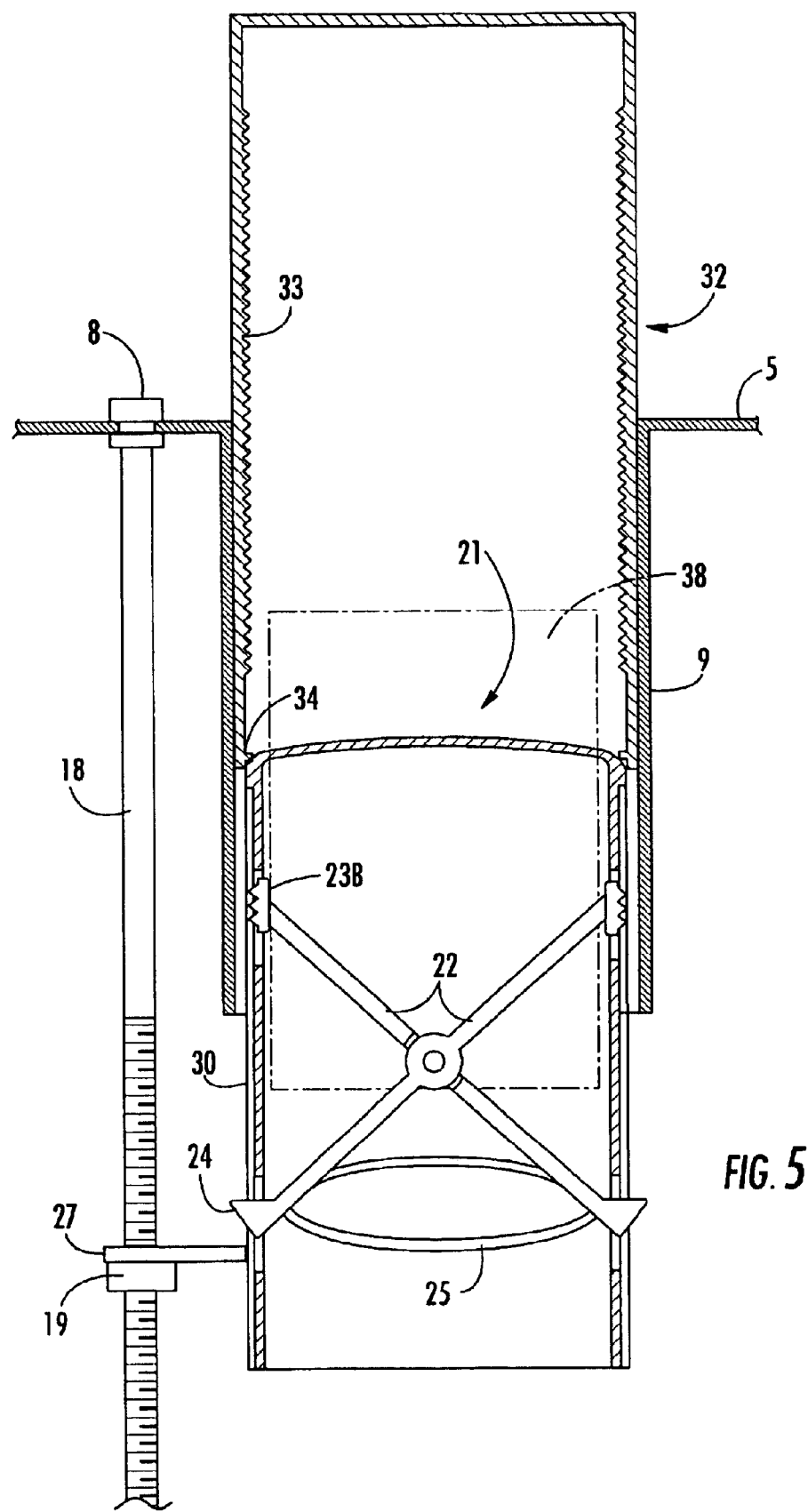

As illustrated in FIG. 5, the bosses 34 with which the receptacle 32 is equipped come into abutment against the closure member 21. The pushing action to which the receptacle is subjected is transmitted to the closure member 21.

The closure member 21 slides until the arm 27 comes into abutment against the nut 19 arranged on the endless screw 18.

During this movement, the closure member 21 has uncovered a fraction of the opening 38, through which the granular material can flow under the effect of gravity.

An additional push is exerted on the receptacle to bring the bosses 34 of the receptacle into the slots 30 of the closure member, the receptacle placing itself in the position illustrated in FIG. 3.

Figure 7:
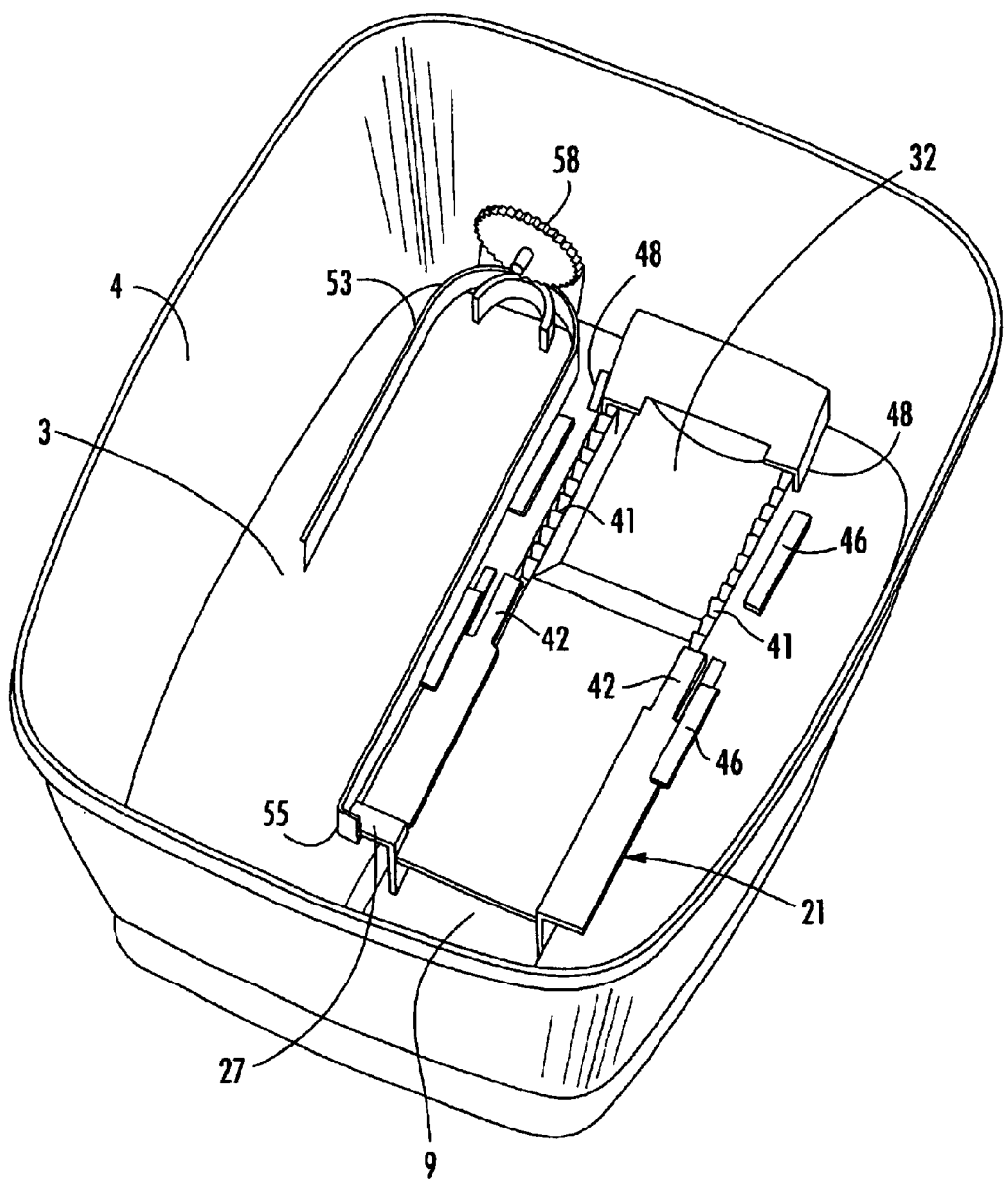
FIG. 7 is a perspective view of another embodiment of the metering device.

FIG. 7 illustrates another form of embodiment of the metering device.

As this figure shows, the receptacle 32 has, on each of its longitudinal edges, racks 41, and the closure member 21 has flexible tabs 42 overhanging each of the racks 41. Each tab 42 has, on its face facing the rack 41, a tooth 44 which engages in the rack 41.

The closure member 21 is equipped with lateral ribs 45 able to slide in slots 46 arranged in the horizontal wall.

Figure 9:
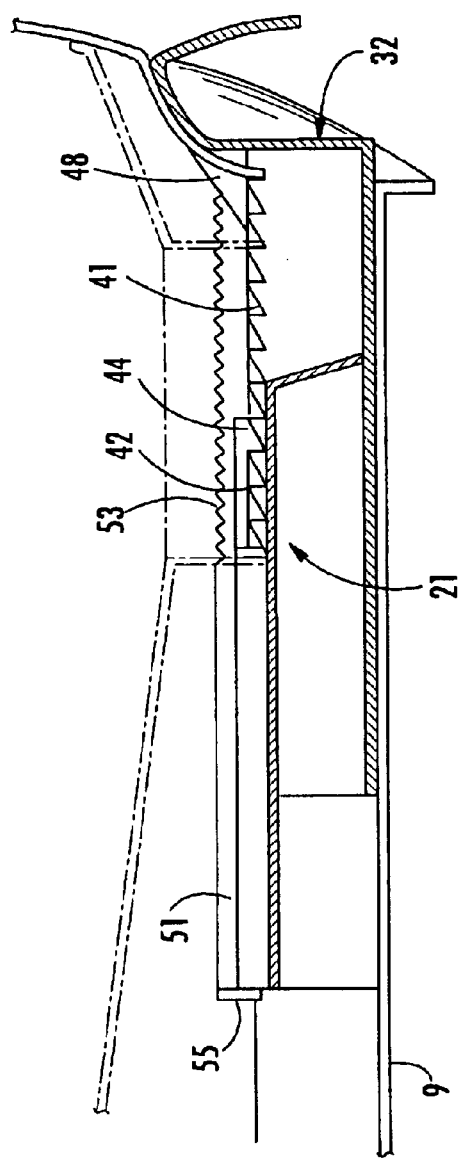
FIGS. 9 and 10 show the metering device during operation.

FIG. 9 shows, in section, the dispenser in a standby position. In this position, the tooth 44 of the tab 42 engaged in the rack 41 thus secures the receptacle 32 to the closure member 21.

The operator wishing to withdraw a dose of granular material pulls on the receptacle 32.

The latter slides in the slide 9 driving the closure member 21, the movement of which is guided by the slots 46.

Figure 10:
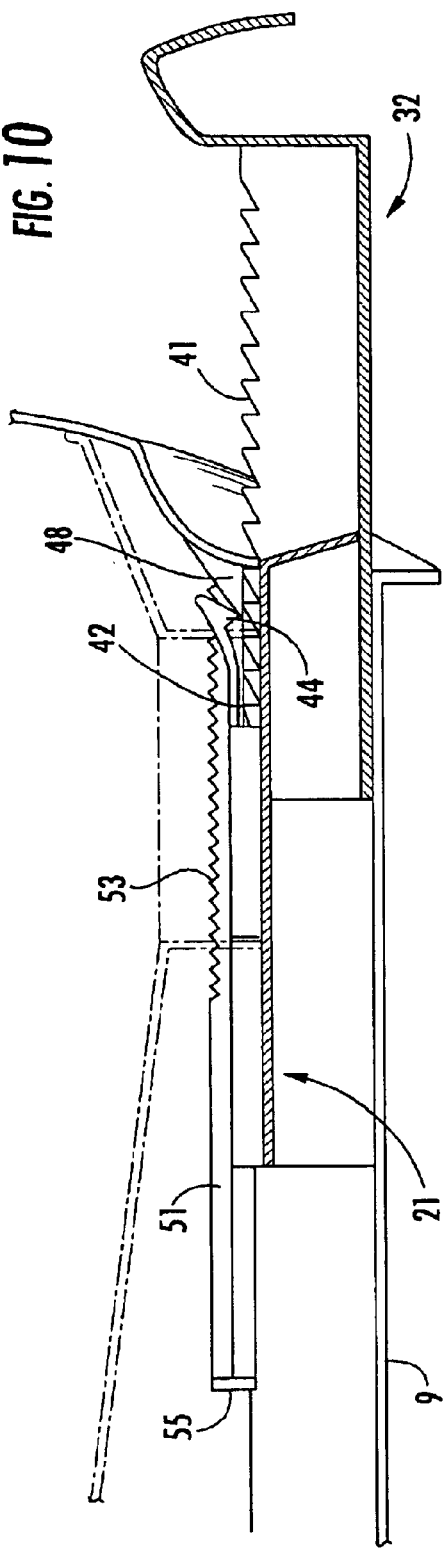

At the end of travel, as depicted in FIG. 10, the tab 42 comes into contact against a ramp 48 formed on the wall 3 and disengages from the rack 41.

The receptacle 32 is then detached from the closure member 21, the latter closing off the window 38.

The receptacle 32 is refitted in the way described above.

Figure 8:
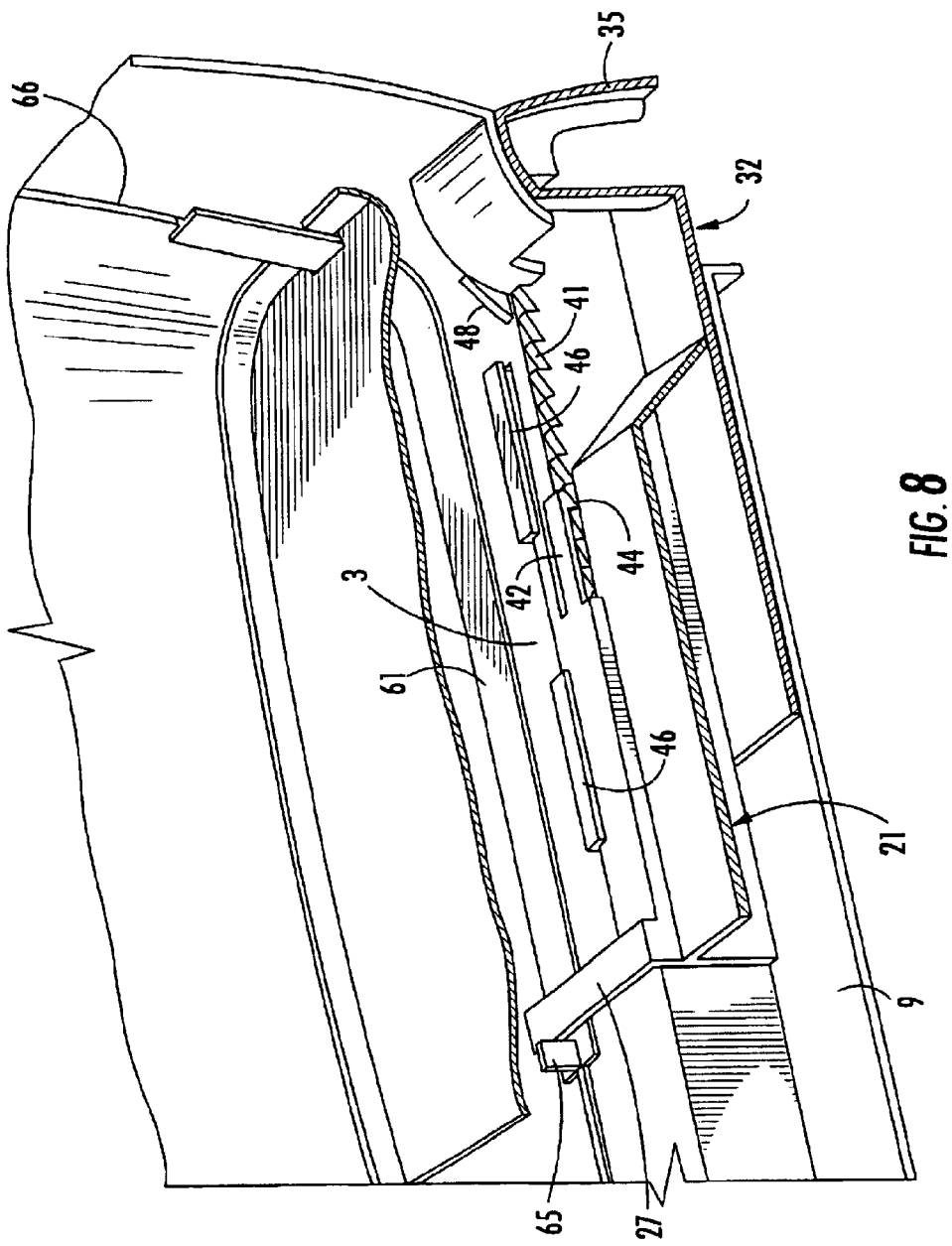
FIG. 8 is a view in section with partial cut-away of this embodiment.

FIGS. 7 and 8 also show two alternative forms of the device for adjusting the position of the closure member 21 using a flexible strip.

FIG. 7 shows a flexible strip 51 perpendicular to the wall 3. This strip 51 parallel to the direction of travel of the closure member has a toothed edge 53 and, at its end, a stop 55.

A toothed wheel 58 meshes in the toothed edge 53.

The rotation of the toothed wheel 58 driven by a knurled knob on the facade of the dispenser causes the flexible strip 51 to slide and this alters the position of the stop 55.

The arm 27 of the closure member 21 comes to bear against this stop 55, the position of which determines the amount of granular material which will drop down into the receptacle 32.

FIG. 8 shows a flexible strip 61 parallel to the wall 3.

The flexible strip 61 has a stop 65 and a slider which travels in a slot 66 made in the wall of the upper reservoir 4.

A graduated scale on the facade of the dispenser runs along the length of the slot 66 to indicate to a user how much granular material will be withdrawn.

By operating the slider, an operator can adjust the position of the stop 65 against which the arm 27 of the closure member 21 comes to bear, thus making it possible to adjust the amount of granular material that flows into the receptacle 32.

The invention thus provides a dispenser which has numerous advantages. In particular, it is extremely easy to use.

It goes without saying that the invention is not restricted to the embodiment described hereinabove by way of example but that it encompasses all alternative forms thereof.

Thus, in the case of a high-capacity dispenser, it is conceivable for the hopper 37 to be equipped with a device preventing the compaction/settlement of the granular material, such as a plate having an opening at its center and placed in the hopper 37 making it possible to form a region in which excess granular material flows back when the closure member is placed in the position closing off the opening 38. The endless screw 18 could be actuated by a micromotor. The lid 14 could be equipped with a carry handle. The blade 39 could be made of stiff bristles preventing granular material from becoming wedged between the closure member and the edge of the opening 38.

What is claimed is:

1. A dispenser for granular material in predetermined doses, comprising:
   an upper part forming a reservoir for storing the granular material; and
   a lower part forming a base supporting a metering device, the upper and lower parts of the dispenser being separated by a horizontal wall comprising a flow window;

wherein, the metering device comprises a closure member that can move between an adjustable open position in which the granular material can flow through the flow window into a removable receptacle and a closed position in which the closure member closes off the flow window;

wherein, the movement of the closure member between the passing position and the closed position is achieved by pulling on the receptacle, said receptacle being rendered temporarily secured to the closure member during movement between the two positions; and wherein, the movement of the closure member between the closed position and the passing position is achieved by pushing on the receptacle, the receptacle including means for forming a stop coming to bear against the closure member.

2. The dispenser of granular material as claimed in claim 1, wherein the receptacle includes at least one rack able to collaborate with at least one tab secured to the closure member supporting a tooth, the tab being able to move between a position engaging the rack, thus securing the closure member and the receptacle, and a second position in which the tab becomes effaced against a ramp disconnecting the receptacle from the closure member.

3. The dispenser of granular material as claimed in claim 2, wherein the rack is situated on the longitudinal edge of the receptacle.

4. The dispenser of granular material as claimed in claim 1, wherein the receptacle is equipped with ribs sliding in slots formed on the horizontal wall.

5. The dispenser of granular material as claimed in claim 1, wherein the receptacle includes at least two racks complementing at least one toothed segment which is arranged on each flank of the closure member parallel to an axis of movement thereof, the toothed segment being able to move between a position protruding beyond the flanks of the closure member and meshing in the racks of the receptacle thus securing the closure member and the receptacle, and a second position in which the toothed segments retract into the closure member thus disconnecting the receptacle from the closure member.

6. The dispenser of granular material as claimed in claim 5, wherein two rigid rods are arranged inside the closure member along diagonals of the closure member the rigid rods being able to move in rotation with respect to a point of intersection of the diagonals and kept apart by an elastic, each of the rigid rods being equipped at one end with a toothed segment and at another end protruding beyond the closure member, with an unlocking stud capable of becoming effaced inside the closure member against a bearing surface and causing the toothed segments to retract through a scissors effect.

7. The dispenser of granular material as claimed in claim 6, wherein the rods are held apart by at least one leaf spring.

8. The dispenser of granular material as claimed in claim 7, wherein the receptacle slides in a corridor formed in the lower part of the dispenser, vertical walls of this corridor acting as a bearing surface for ramps protruding beyond the closure member.

9. The dispenser of granular material as claimed in claim 5, wherein the closure member is equipped with lateral lugs that complement grooves formed in the lower part of the dispenser.

10. The dispenser of granular material as claimed in claim 1, wherein the closure member is equipped with a bearing arm extending at right angles to a flank of the closure member and able to come to bear against adjustable means forming a stop.

11. The dispenser of granular material as claimed in claim 10, further comprising a flexible strip sliding in translation parallel to a direction of travel of the closure member including a stop against which the arm comes to bear.

12. The dispenser of granular material as claimed in claim 11, wherein the strip has a toothed edge in which a toothed wheel engages, rotation of the wheel causing translational movement of the strip.

13. The dispenser of granular material as claimed in claim 11, wherein the strip has a slider protruding from a slot formed in the wall of the reservoir and allowing the strip to be slid.

14. The dispenser of granular material as claimed in claim 10, wherein an endless screw which can be turned by a knurled knob is arranged in the lower part of the dispenser, parallel to an axis of travel of the closure member, the endless screw taking a floating nut against which the bearing arm of the closure member butts.

15. The dispenser of granular material as claimed in claim 1, wherein an end of the closure member facing the receptacle has an inclined plane.

16. The dispenser of granular material as claimed in claim 1, wherein the receptacle is equipped with two bosses which come to bear against the closure member when a pushing action is exerted on the receptacle, so as to bring the closure member from the position of closure to the position of opening of the flow window at the end of the push, the bosses becoming housed in slots formed in the closure member.

17. The dispenser of granular material as claimed in claim 1, wherein a hopper having flanks which converge toward an opening, is arranged inside the reservoir.

18. The dispenser of granular material as claimed in claim 17, wherein a side of the opening of the hopper or of the flow window is equipped with a rubber blade.

* * * * *